United States Patent Office 2,945,854
Patented July 19, 1960

2,945,854

CERTAIN BETA-PYRIDYL, DIALKOXY ACRYLOPHENONES

John Koo and Werner Richard Boehme, Somerville, N.J., assignors to Ethicon, Inc., a corporation of New Jersey No Drawing. Filed February 17, 1959, Ser. No. 793,694

11 Claims. (Cl. 260—240)

This invention relates to a new series of organic compounds. More particularly, the present invention is concerned with certain substituted acrylophenones, salts thereof and methods for their preparation.

The novel compounds of this invention are 2-$R_1$-3,6-dialkoxy-$\beta$-$R_2$-acrylophenones wherein $R_1$ is a hydrogen or hydroxy, $R_2$ is a pyridyl or thiophenyl and the alkoxy substituents such as methoxy, ethoxy, propoxy, ispropoxy, butoxy, isobutoxy, pentoxy, etc. The compounds may be prepared by condensation of the corresponding $R_2$-carboxaldehyde, e.g., pyridine carboxaldehyde with a 2-$R_1$-3,6-dialkoxy-acetophenone in the presence of an inorganic or organic base such as an alkali metal hydroxide, e.g., sodium hydroxide or potassium hydroxide or a tertiary amine, e.g., pyridine or piperidine. The reaction may be conducted at a wide variety of temperatures, i.e., 0° C.–100° C. but 23° C.–30° C. is most convenient and preferred.

The novel compounds are useful as coronary dilators, antihypertensive agents and tranquilizers as evidenced by tests conducted in accordance with the procedures described by Craver et al., J. Pharmacol, Exptl. Therap. 93, 135 (1948); and Winter et al., ibid., 94, 7 (1948).

The compounds of this invention may be converted to their therapeutically useful acid addition salts by reaction with an appropriate acid, as for example, an inorganic acid such as a hydrohalic acid, i.e., hydrochloric, hydrobromic or hydriodic acid; sulfuric, nitric, or thiocyanic acid; a phosphoric acid; an organic acid such as methanesulfonic, ethanesulfonic, hydroxyethanesulfonic, benzenesulfonic, p-toluenesulfonic, salicyclic, p-aminosalicyclic, 2-phenoxy-benzoic or 2-acetoxy-benzoic acid or, when R=OH to their soluble salts by reaction with a base such as sodium hydroxide, triethylamine, diethanolamine, diethylaminoethanol, triethanolamine trinitrate or N-isopropylarterenol.

The following examples are included to describe the invention in greater detail, but not to limit the scope thereof.

Example I

To a stirred solution of 1.8 parts by weight of 2-hydroxy-3,6-dimethoxyacetophenone in 50 parts by volume of 7% sodium hydroxide in 30% aqueous ethanol, previously cooled to 10° C. in an ice bath, is added dropwise 1.1 parts by weight of 3-pyridine carboxaldehyde during a period of about ten minutes. The stirring is continued at room temperature for another five hours and the mixture is then made slightly acidic (approximately pH 6) with dilute hydrochloric acid. The yellow oil which separates is extracted with two 30 parts by volume portions of diethyl ether. After drying over anhydrous magnesium sulfate, the combined ether extracts are treated with hydrogen chloride gas, thus causing a heavy precipitate to form. After filtration of the precipitate, it is re-crystallized first from ethanol-ether and then from dilute ethanol to yield $\beta$-(3-pyridyl)-2-hydroxy-3,6-dimethoxyacrylophenone hydrochloride, melting at 233–234° C. (dec.).

Analysis.—Calculated for $C_{16}H_{17}NO_4Cl$

|   | Theory | Found |
|---|---|---|
| C | 59.54% | 59.47% |
| H | 5.31% | 5.07% |
| N | 4.34% | 4.41% |

Example II

A solution of 11 parts by weight of 3-pyridinecarboxaldehyde, 18 parts by weight of 2,5-dimethoxyacetophenone, 150 parts by volume of pyridine and 20 drops of piperidine is gently refluxed for five hours and the solution is poured into 400 parts by volume of cold water. The oily material which separates is repeatedly extracted with ether. The combined ether solutions are first washed with saturated sodium bisulfite solution, then with cold water and finally with three portions (25 parts by volume each) of 10% hydrochloric acid. Upon concentration and cooling of the acidic extracts, there separates an orange colored product which is filtered and dried. On recrystallization from 95% ethanol, bright yellow needles of $\beta$-(3-pyridyl)-2,5-dimethoxyacrylophenone hydrochloride are obtained, melting point: 204° C.–205° C. (dec.).

Analysis.—Calculated for $C_{16}H_{16}O_3NCl$

|   | Theory | Found |
|---|---|---|
| C | 62.85% | 62.71% |
| H | 5.24% | 5.53% |
| N | 4.58% | 4.65% |

Example III

A solution of 16 parts by weight of 4-pyridinecarboxaldehyde, 27 parts by weight of 2,5-dimethoxyacetophenone, 100 parts by volume of pyridine and 15 drops of piperidine is gently refluxed for three hours, and after cooling the solution is poured into 300 parts by volume of water. The oily material which separates is extracted with ether. The ether solution is first washed with saturated sodium bisulfite solution, then with cold water and finally with three portions (25 parts by volume each) of 10% hydrochloric acid. Upon concentration of the acidic extracts, there separates an orange colored product which is filtered and dried. On recrystallization from absolute ethanol, bright yellow needles of $\beta$-(4-pyridyl)-2,5-dimethoxyacrylophenone hydrochloride are obtained, melting point: 228° C.–230° C. (dec.).

Analysis.—Calculated for $C_{16}H_{16}O_3NCl$

|   | Theory | Found |
|---|---|---|
| C | 62.85% | 62.56% |
| H | 5.28% | 5.24% |
| N | 4.58% | 4.76% |

What is claimed is:

1. A member of the group consisting of 2-$R_1$-3,6-di-lower alkoxy-$\beta$-$R_2$-acrylophenone wherein $R_1$ is a member of the group consisting of hydrogen and hydroxy and $R_2$ is pyridyl and therapeutically useful acid addition salts thereof.

2. $\beta$-Pyridyl-2-hydroxy-3,6-di-lower alkoxyacrylophenone.

3. $\beta$-Pyridyl-3,6-di-lower alkoxyacrylophenone.

4. Therapeutically useful acid addition salts of the compounds of claim 2.

5. Therapeutically useful acid addition salts of the compounds of claim 3.

6. $\beta$-(3-pyridyl)-2-hydroxy-3,6-dimethoxyacrylophenone.

7. β-(3-pyridyl)-2-hydroxy-3,6-dimethoxyacrylophenone-hydrochloride.
8. β-(3-pyridyl)-3,6-dimethoxyacrylphenone.
9. β-(3-pyridyl)-3,6-dimethoxyacrylophenone-hydrochloride.
10. β-(4-pyridyl)-3,6-dimethoxyacrylophenone.
11. β-(4-pyridyl)-3,6-dimethoxyacrylophenone-hydrochloride.

References Cited in the file of this patent

Marino-Bettolo et al.: Chem. Abstracts, vol. 41, col. 6566 (1947).